(12) United States Patent
Chien (10) Patent No.: US 9,798,224 B2
(45) Date of Patent: Oct. 24, 2017

(54) PROJECTOR

(71) Applicants: QISDA OPTRONICS (SUZHOU) CO., LTD., Suzhou, Jiangsu (CN); QISDA CORPORATION, Taoyuan (TW)

(72) Inventor: Chih-Shiung Chien, Taoyuan (TW)

(73) Assignees: Qisda Optronics (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 0 days.

(21) Appl. No.: 14/997,589

(22) Filed: Jan. 18, 2016

(65) Prior Publication Data

US 2016/0216599 A1    Jul. 28, 2016

(30) Foreign Application Priority Data

Jan. 23, 2015    (TW) .............................. 104102384 A (51) Int. Cl.

| G03B 21/28 | (2006.01) |
|---|---|
| G02B 27/12 | (2006.01) |
| H04N 9/31 | (2006.01) |
| G03B 21/20 | (2006.01) |
| G03B 21/00 | (2006.01) |
| G02B 17/08 | (2006.01) |
| G02B 13/16 | (2006.01) |

(52) U.S. Cl.
CPC ......... G03B 21/2066 (2013.01); G02B 13/16 (2013.01); G02B 17/08 (2013.01); G03B 21/008 (2013.01); G03B 21/28 (2013.01); G03B 21/208 (2013.01)

(58) Field of Classification Search
CPC .. G03B 21/008; G03B 21/28; G03B 21/2066; G03B 21/208; G02B 27/126; G02B 13/16; H04N 9/3111; H04N 9/3114
USPC ......................................... 353/81, 33, 98, 99
See application file for complete search history.

(56) References Cited

U.S. PATENT DOCUMENTS

| 2003/0123162 A1* | 7/2003 | Penn | G02B 26/0833 |
| | | | 359/833 |
| 2009/0190101 A1* | 7/2009 | Alasaarela | G02B 5/04 |
| | | | 353/81 |
| 2016/0241819 A1* | 8/2016 | Chien | H04N 9/315 |

FOREIGN PATENT DOCUMENTS

| CN | 102565897 A | 7/2012 |
| CN | 104335117 A | 2/2015 |
| TW | 200513679 | 4/2005 |
| TW | M426771 U1 | 4/2012 |

* cited by examiner

*Primary Examiner* — Ryan Howard (57) ABSTRACT

A projector includes a light source, a digital micro-mirror device (DMD), a first prism, a second prism, and a lens. The light source is used for emitting an incident light. The DMD is used for receiving and reflecting the incident light as an image light. The first prism is disposed between the light source and the DMD. The second prism is disposed between the first prism and the DMD. The first prism includes a first plane, a second plane, and an intermediate portion. The intermediate portion adjoins the first plane and includes a reflecting portion. The incident light from the second plane is reflected by the reflecting portion and then passes through the second plane. The second prism includes a fourth plane, a fifth plane, and a sixth plane. When the DMD is operated in an on-state, the image light passes through the sixth plane.

13 Claims, 6 Drawing Sheets

PROJECTOR

BACKGROUND OF THE INVENTION

1. Field of the Invention

The present invention illustrates a projector, and more particularly, the projector with a two-axis tilting digital micro-mirror device.

2. Description of the Prior Art

The conventional projector can project micro-images to a huge screen by a digital micro-mirror device (DMD). Further, since the conventional projector provides sufficient brightness, the image data can be displayed and then shared to everyone.

Figure 1:
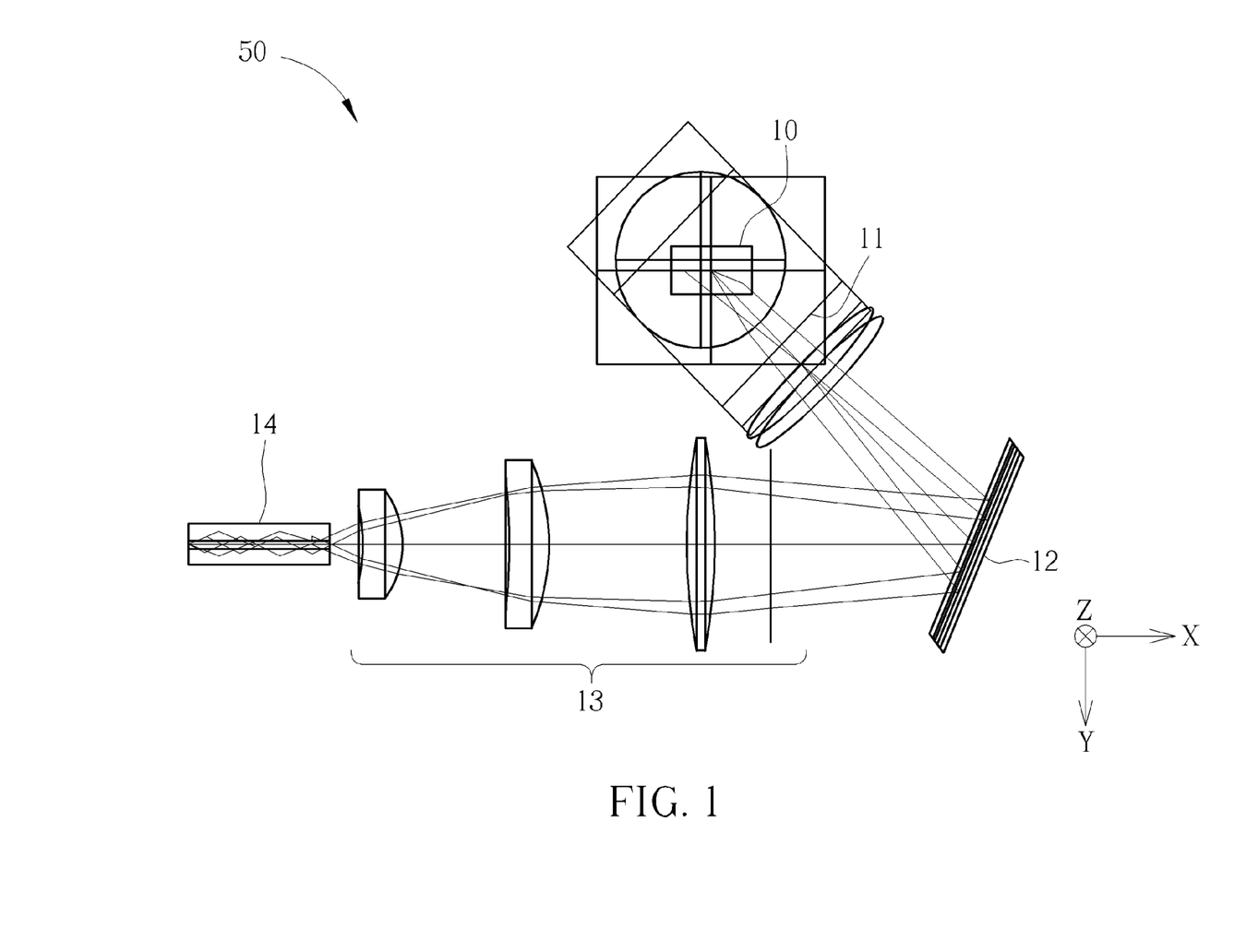
FIG. 1 illustrates a structure of a conventional projector.

FIG. 1 illustrates a structure of a conventional projector 50. As shown in FIG. 1, the conventional projector 50 includes a digital micro-mirror device 10, a total internal reflection (TIR) prism set 11, a reflecting mirror (reflector) 12, a lens module 13, and a light pipe 14. For illustrating viewing direction explicitly, 3 perpendicular axes of Cartesian coordinates are represented on the right hand side in FIG. 1. Specifically, the viewing direction on X-axis is a direction from an origin point to the right side. The viewing direction on Y-axis is a direction from the origin point to the underside. The viewing direction on Z-axis is an incident direction on X-Y plane. In the conventional projector 50, an incident light passes the lens module 13 through the light pipe 14 and is reflected to the TIR prism set 11 by the reflecting mirror 12. Finally, the incident light is reflected as an image light by the digital micro-mirror device 10 and then projected to the screen. However, the digital micro-mirror device 10 can only receive the incident light with oblique incident direction because of the physical limitation of the digital micro-mirror device 10. Thus, the disposition between the TIR prism set 11 and the digital micro-mirror device 10 introduces an inclination angle (i.e., such as 45 degrees of angle). As a result, the volume of the conventional projector 50 is bounded by the inclination angle. Since the volume reduction is the major issue of the projector design, the conventional projector 50 with big volume becomes inconvenient and thereby losses of competitiveness.

Thus, to develop a projector with small volume is important.

SUMMARY OF THE INVENTION

In an embodiment of the present invention, a projector is disclosed. The projector includes a light source, a digital micro-mirror device, a first prism, a second prism, and a lens. The light source is used for emitting an incident light. The digital micro-mirror device has a first side in a first direction and a second side in a second direction perpendicular to the first direction, wherein the first side is longer than the second side. The digital micro-mirror device receives and reflects the incident light as an image light. The first prism is disposed between the light source and the digital micro-mirror device for receiving and transmitting the incident light. The first prism includes a first plane faced to the light source for receiving the incident light, a second plane adjoined to the first plane, and an intermediate portion. The intermediate portion is adjoined to the first plane and includes a reflecting portion, wherein the incident light is reflected by the reflecting portion and then passes through the second plane. The second prism is disposed between the first prism and the digital micro-mirror device. The second prism includes a fourth plane, a fifth plane, and a sixth plane. The fourth plane is parallel to the second plane for receiving the incident light. The fifth plane is adjoined to the fourth plane and is parallel to the digital micro-mirror device, wherein the fifth plane includes an adjoining side paralleled to the first side. The sixth plane is adjoined to the fourth plane and the fifth plane. The lens is faced to the sixth plane for receiving and projecting the image light. The incident light is transmitted to the digital micro-mirror device through the fourth plane and the fifth plane. The image light passes through the fifth plane and is reflected by the fourth plane. When the digital micro-mirror device operates in an ON-state, the image light passes through the sixth plane.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
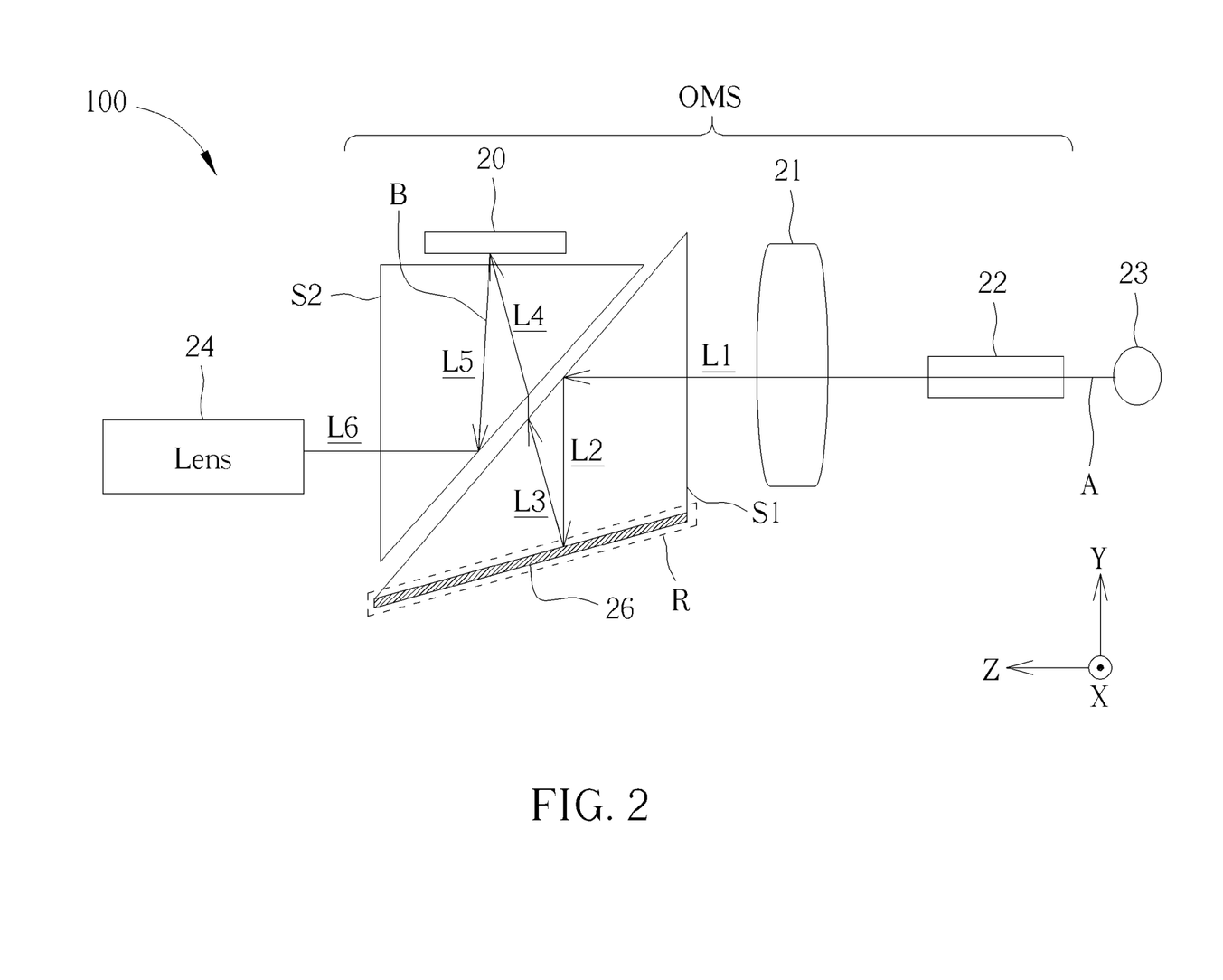
FIG. 2 illustrates a structure of a projector according to a first embodiment of the present invention.
Figure 3:
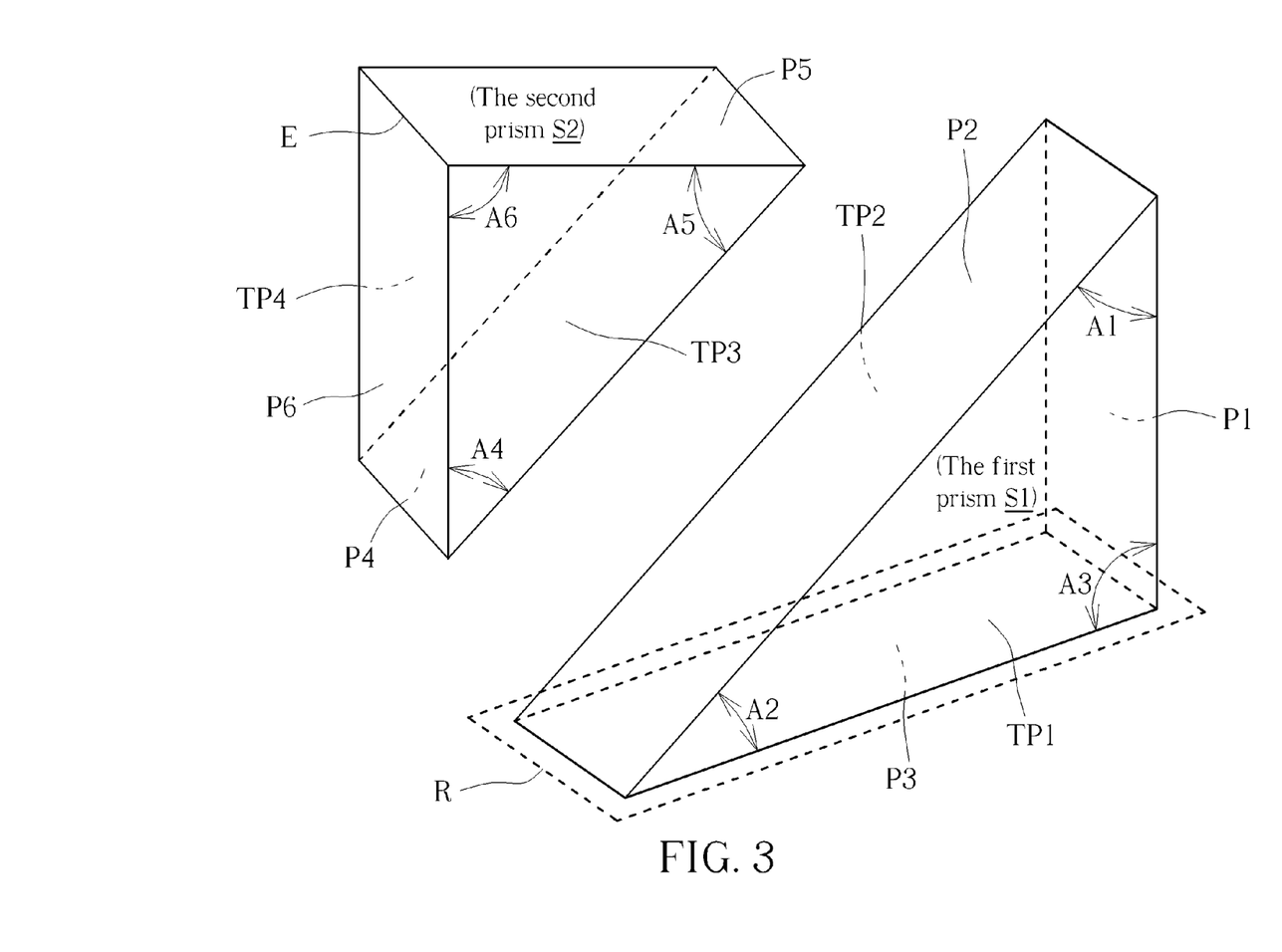
FIG. 3 illustrates a structure of two prisms of the projector in FIG. 2 according to the first embodiment of the present invention.
Figure 4:
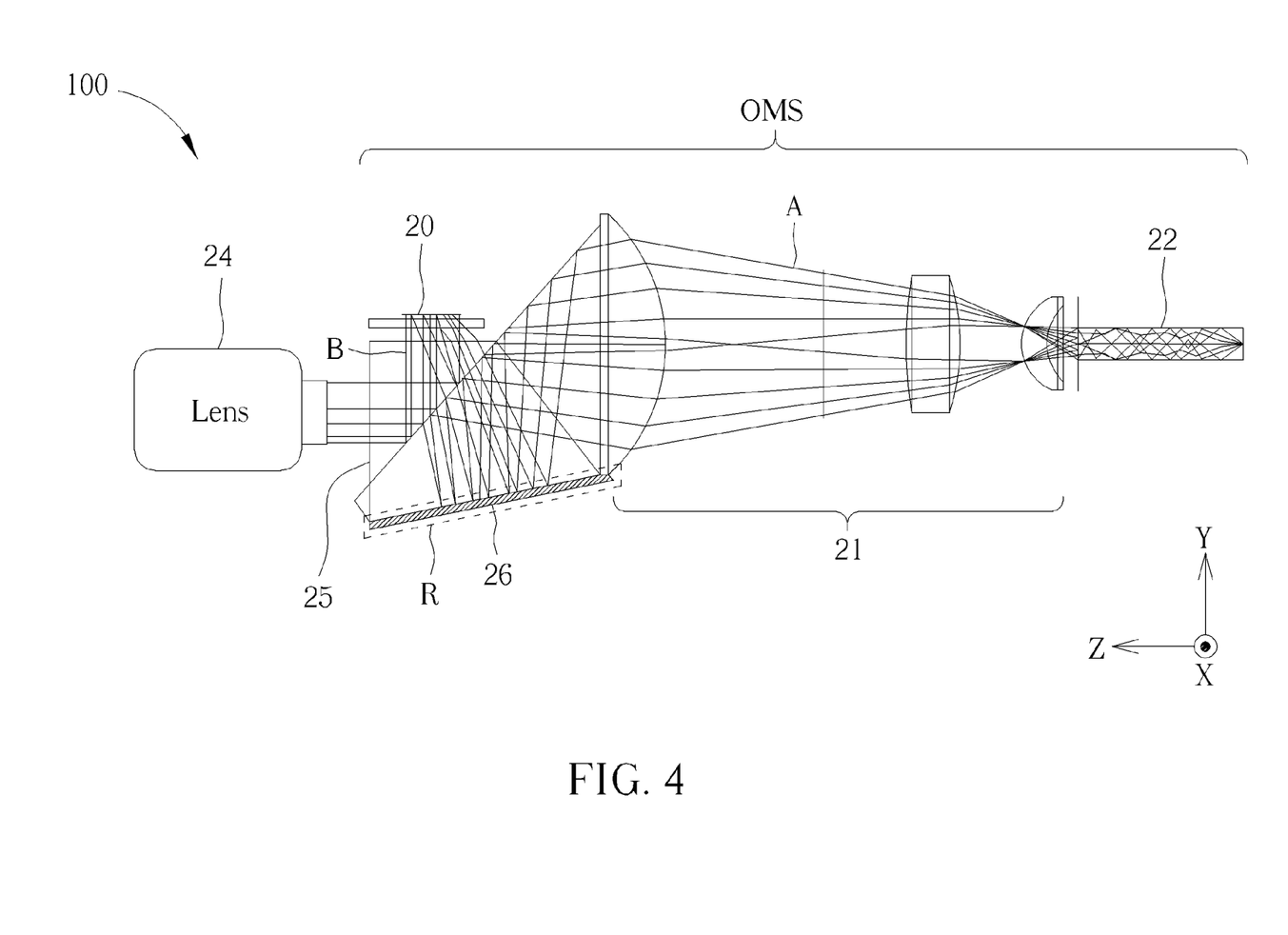
FIG. 4 illustrates a simulation result of light paths of the projector in FIG. 2 according to the first embodiment of the present invention.

FIG. 2 illustrates a structure of a projector 100 according to a first embodiment of the present invention. FIG. 3 illustrates a structure of two prisms of the projector 100 in FIG. 2 according to the first embodiment of the present invention. FIG. 4 illustrates a simulation result of light paths of the projector 100 in FIG. 2 according to the first embodiment of the present invention. The structure of the projector 100 according to the first embodiment, the structure of two prisms, and the simulation result of light paths of the projector 100 are expressed as follows. As shown in FIG. 2, the projector 100 includes a digital micro-mirror device 20, a lens module 21, a light pipe 22, a light source 23, a lens 24, a first prism S1, and a second prism S2. Specifically, the light pipe 22, the lens module 21, the first prism 21, the second prism S2, and the digital micro-mirror device 20 form an optical mechanical system OMS. The light source 23 is used for emitting an incident light A. The digital micro-mirror device 20 is a rectangular-shaped flat device. Specifically, the digital micro-mirror device 20 has a plurality of micro-mirrors for reflecting the incident light A to an image light B. The digital micro-mirror device 20 has a long side C in a first direction and a short side D in a second direction perpendicular to the first direction (i.e., see FIG. 6). In this embodiment, the digital micro-mirror device 20 is a two-axis tilting digital micro-mirror device (i.e., TRP (Tilt & Roll Pixel) DLP® Pico™ chipset). Particularly, each micro-mirror is sequentially tilted 12 degrees on two diagonal axes (i.e., equivalently, 17 degrees of tilting angle of the long side C on X-axis). Thus, the incident light A is reflected as the image light B with approximate 34 degrees of angle equivalently. The lens 24 is used for receiving the image light B. The first prism S1 and the second prism S2 are disposed among the lens module 21, the digital micro-mirror device 20, and the lens 24 for receiving the incident light A from the lens module 21, reflecting the incident light A to the digital micro-mirror device 20, and transmitting the image light B to the lens 24. The first prism S1 includes an intermediate portion R. The intermediate portion R is adjoined to a first plane P1 (see FIG. 3) and includes a reflecting portion 26. In this embodiment, the reflecting portion 26 can be a mirror coating on a third plane P3 of the first prism S1 (see FIG. 3). The reflecting portion 26 can also be a plano-convex mirror lens with a reflection plane. In the projector 100, after the light source 23 emits the incident light A, the incident light A is transmitted to the lens module 21 through the light pipe 22. The incident light A is further transmitted to the first prism S1 along a light path L1. Then, the incident light A is transmitted to the reflecting portion 26 of the first prism S1 along a light path L2. After the incident light A is reflected by the reflecting portion 26, the incident light A is transmitted to the digital micro-mirror device 20 along a light path L3 and a light path L4 progressively. The digital micro-mirror device 20 reflects the incident light A as the image light B. When the micro-mirror device 20 operates in an ON-state, the image light B is transmitted along a light path L5. Then, the image light B passes through the second prism S2 along a light path L6 and is received by the lens 24. The detailed expression of light transmission process is illustrated later. For illustrating viewing direction explicitly, 3 perpendicular axes of Cartesian coordinates are represented on the lower right hand side in FIG. 2. Specifically, the viewing direction on X-axis is an emitting direction on Y-Z plane. The viewing direction on Y-axis is a direction from an origin point to the upside. The viewing direction on Z-axis is a direction from the origin point to the left side. In this embodiment, a space exists between the first prism S1 and the second prism S2. Another space also exists between the second prism S2 and the digital micro-mirror device 20. Although two spaces are introduced in this embodiment, the present invention is not limited by the two spaces. For example, in other embodiments, no space is introduced between the first prism S1 and the second prism S2, and between the second prism S2 and the digital micro-mirror device 20. The structure of the first prism S1 and the second prism S2 in the projector 100 and the light transmission process are illustrated below.

FIG. 3 illustrates a structure of two prisms of the projector 100 according to a first embodiment of the present invention. In this embodiment, the first prism S1 is a triangular prism with 5 planes. The first prism S1 includes a first triangular plane TP1, a second triangular plane TP2, a first plane P1, a second plane P2, and an intermediate portion R. The intermediate portion R is adjoined to the first plane P1 and includes the third plane P3. A first angle A1 is located between the first plane P1 and the second plane P2. A second angle A2 is located between the second plane P2 and the third plane P3. A third angle A3 is located between the third plane P3 and the first plane P1. In some embodiments, the third angle A3 is greater than the first angle A1 and the second angle A2. For example, the first angle A1 can be 35.5 degrees. The second angle A2 can be 45.0 degrees. The third angle A3 can be 99.5 degrees. The second prism S2 is also a triangular prism with 5 planes. The second prism S2 includes a third triangular plane TP3, a fourth triangular plane TP4, a fourth plane P4, a fifth plane P5, and a sixth plane P6. A fourth angle A4 is located between the fourth plane P4 and the sixth plane P6. A fifth angle A5 is located between the fourth plane P4 and the fifth plane P5. A sixth angle A6 is located between the fifth plane P5 and the sixth plane P6. In some embodiments, the fifth angle A5 can be equal to the second angle A2. For example, the fifth angle A5 can be 45.0 degrees. The fourth angle A5 can be 45.0 degrees. The sixth angle A6 can be 90.0 degrees. Specifically, the first prism S1 and the second prism S2 have to satisfy the following conditions in some preferred embodiments. The second plane P2 of the first prism S1 is parallel to the fourth plane P4 of the second prism S2. The fifth plane P5 of the second prism S2 is parallel to the digital micro-mirror device 20 in FIG. 2 on Z-axis. The fifth plane P5 of the second prism S2 is perpendicular to the sixth plane P6. The adjoining side E is introduced between the fifth plane P5 and the sixth plane P6 of the second prism S2. Specifically, the adjoining side E is parallel to the digital micro-mirror device 20 on X-axis. An optional condition is also introduced that the first plane P1 of the first prism S1 is paralleled to the sixth plane P6 of the second prism S2. The transmission processes of the incident light A and the image light B of the structure in FIG. 2 and FIG. 3 are illustrated below.

In projector 100, the light pipe 22 receives the incident light A emitted from the light source 23. In some embodiments, the light pipe 22 can be a wedge-shaped light pipe. The wedge-shaped light pipe is defined that the measure of caliber for receiving the incident light A is greater than the measure of caliber for outputting the incident light A. Thus, the coupling efficiency of the light pipe 22 can be improved. The incident light A passes through the light pipe 22 and the lens module 21 progressively. The function of the lens module 21 is used for concentrating the beam from the incident light A by light focusing characteristics. By doing so, the incident light A can be projected on the digital micro-mirror device 20 precisely. In some embodiments, the lens module 21 includes at least one lens. An equivalent focal length of the lens module 21 may be 80 mm-82 mm. In other words, the transmitted direction of the incident light A is parallel to the direction of a normal vector of the first plane P1. The incident light A is transmitted along a light path L1 inside the first prism S1. Then, the incident light A is reflected by the second plane P2 of the first prism S1. Here, the reflection is a total internal reflection. After the incident light A is reflected, the incident light A is transmitted to the reflecting portion 26 of the intermediate portion R along a light path L2. The intermediate portion R includes the third plane P3. In this embodiment, the reflecting portion 26 is a mirror coating on the third plane P3. After the incident light A is reflected by the reflecting portion 26, the incident light A is transmitted back to the first prism S1 along a light path L3. The incident light A further passes through the second plane P2 along the light path L3. The incident light A is refracted by a space (air) between the first prism S1 and the second prism S2. Then, the incident light A passes through the fourth plane P4 and the fifth plane P5 of the second prism S2 progressively along a light path L4. Finally, the incident light A is transmitted to the digital micro-mirror device 20. Here, the digital micro-mirror device 20 has the long side C on X-axis and the short side D on Z-axis. The adjoining side E between the fifth plane P5 and the sixth plane P6 of the second prism S2 is parallel to the long side C of the digital micro-mirror device 20 on X-axis. Thus, the beam of the incident light A being transmitted to the digital micro-mirror device 20 along the light path L4 on X-Y plane can be regarded as the beam of the incident light A being transmitted to the long side C of the digital micro-mirror device 20 (see FIG. 6) without any additional inclination angle (i.e., a straight line in FIG. 6). In some embodiments, since the digital micro-mirror device 20 is a two-axis tilting digital micro-mirror device (i.e., TRP (Tilt & Roll Pixel) DLP® Pico™ chipset), each micro-mirror can be sequentially tilted 12 degrees on two axes (i.e., equivalently, 17 degrees of tilting angle of the long side C on X-axis). As a result, after the incident light A is transmitted to the digital micro-mirror device 20 along the light path L4, the incident light A is reflected as the image light B with approximate 34 degrees of angle. Further, the image light B is transmitted along the light path L5. After the image light B passes through the fifth plane P5 of the second prism S2, the image light B is transmitted to the fourth plane P4. Then, the image light B is reflected by the fourth plane P4 and is transmitted to the lens 24 along a light path L6 bypassing through the sixth plane P6. Here, the reflection of the image light B on the fourth plane P4 is a total internal reflection. Specifically, the image light B is perpendicularly transmitted to the sixth plane P6 of the second prism S2. Thus, the image light B passes through the sixth plane P6 without any reflection. Finally, the image light B is received by the lens 24.

FIG. 4 illustrates a simulation result of the incident light A and the image light B of the projector 100 in FIG. 2 according to a first embodiment of the present invention. The viewing direction in FIG. 4 is same as the viewing direction in FIG. 2. Thus, the illustration of the viewing direction is omitted here. As shown in FIG. 4, the incident light A is transmitted to the lens module 21 through the light pipe 22. The lens module 21 concentrates the beam from the incident light A and then transmits the incident light A to a pixel region of the digital micro-mirror device 20 according to the light paths illustrated in FIG. 2 and FIG. 4. Then, the incident light A is reflected as the image light B by the digital micro-mirror device 20 and is further transmitted to the lens 24. After the lens 24 receives the image light B, the lens projects the image light B to the screen for image display. Specifically, the projector 100 uses the two-axis tilting digital micro-mirror device. The adjoining side E between the fifth plane P5 and the sixth plane P6 is paralleled to the long side C of the micro-mirror device 20. Thus, no additional inclination angle is required between the total internal reflection (TIR) prism set 25 and the digital micro-mirror device 20 of the projector 100. As a result, comparing with the conventional projector 50, the volume of the projector 100 can be reduced. To further reduce the volume of the projector 100, a projector of another embodiment is introduced as follows.

Figure 5:
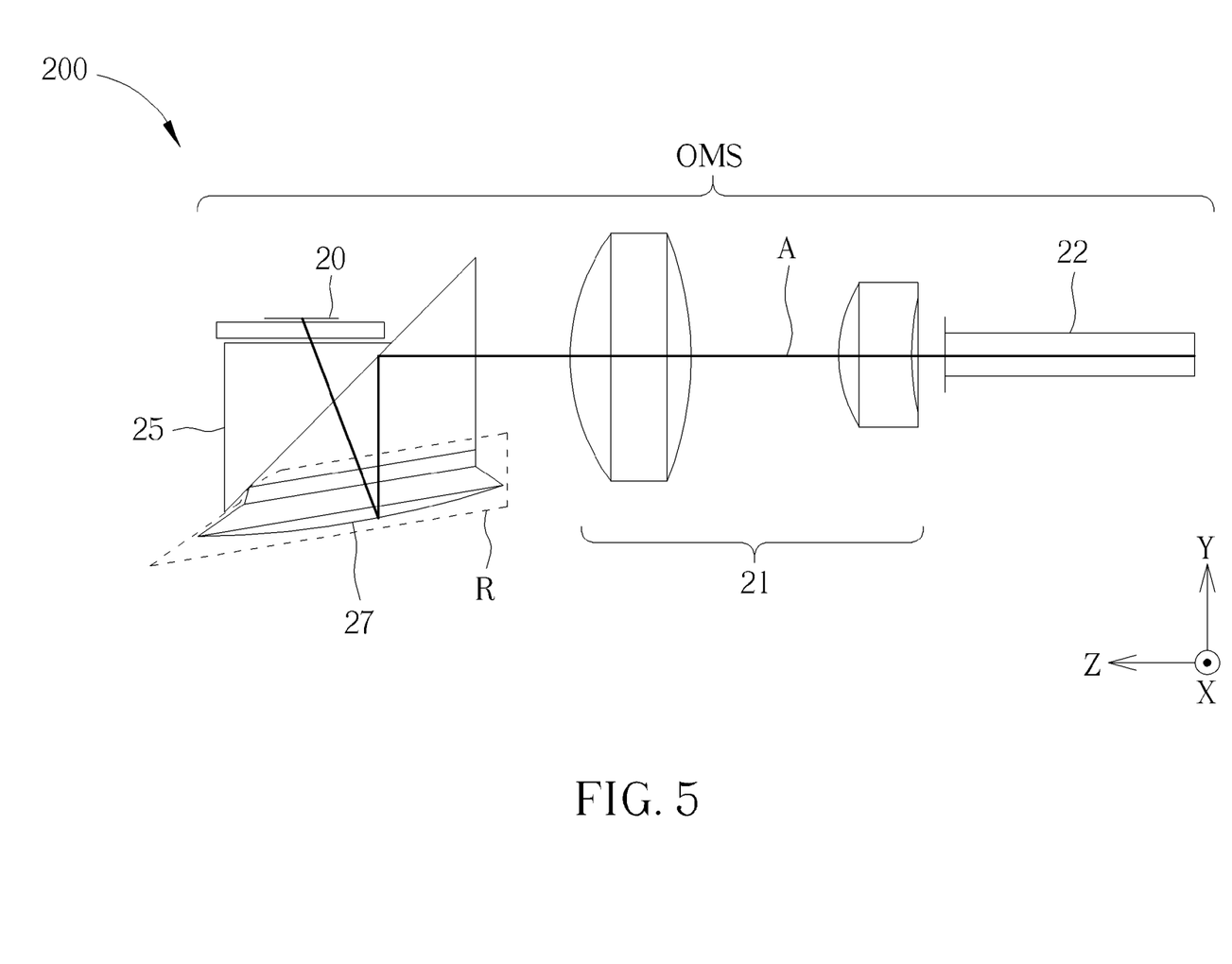
FIG. 5 illustrates an optical mechanical system of a projector according to a second embodiment of the present invention.
Figure 6:
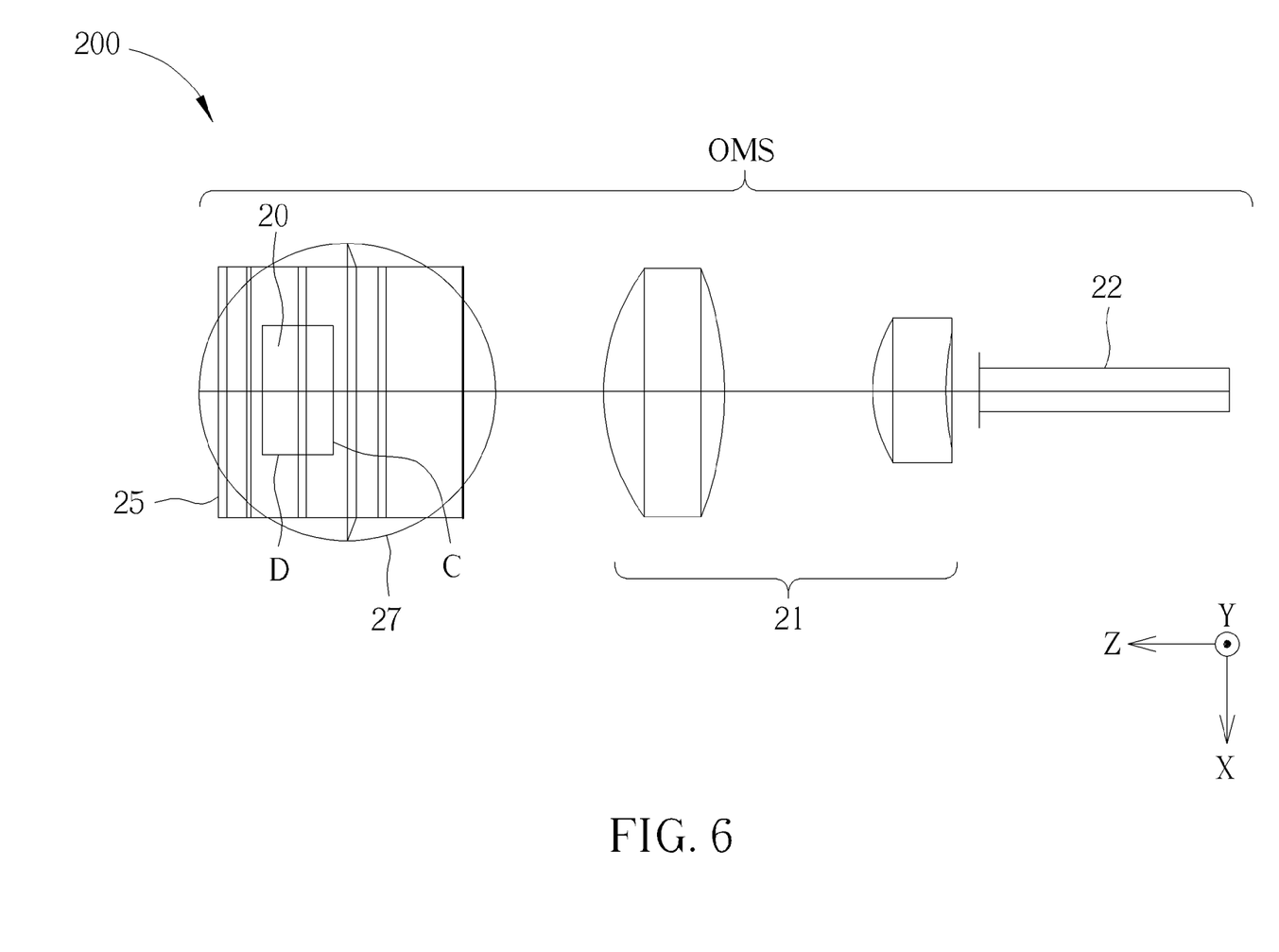
FIG. 6 illustrates a side view of the optical mechanical system in FIG. 5 according to the second embodiment of the present invention.

FIG. 5 illustrates an optical mechanical system OMS of a projector 200 according to a second embodiment of the present invention. FIG. 6 illustrates a side view of the optical mechanical system OMS of the projector 200 according to the second embodiment of the present invention. As shown in FIG. 5, the optical mechanical system OMS of the projector 200 is similar to the optical mechanical system OMS of the projector 100, including a digital micro-mirror device 20, a lens module 21, a light pipe 22, and a TIR prism set 25. The viewing direction in FIG. 5 is same as the viewing direction in FIG. 2 and FIG. 4. Thus, the illustration of the viewing direction in FIG. 5 is omitted here. The difference between the projector 200 and the projector 100 is that an equivalent focal length of the optical mechanical system OMS in projector 200 is formed by a combination of the focal length of the lens module 21 and the plano-convex lens 27 of the intermediate portion R. An equivalent focal length of the optical mechanical system OMS in projector 100 is only affected by the focal length of the lens module 21. In other words, the projector 200 can perform a predesigned focal length with shorter light distance of the optical mechanical system OMS than the projector 100. In FIG. 6, for illustrating viewing direction explicitly, 3 perpendicular axes of Cartesian coordinates are represented on the lower right hand side. Specifically, the viewing direction on X-axis is a direction from an origin point to the underside. The viewing direction on Y-axis is an emitting direction on X-Z plane. The viewing direction on Z-axis is a direction from the origin point to the left side. Thus, in the viewing direction on Y-axis in FIG. 6, the transmitted directions of the incident light A and the image light B are consistent in a straight line through the light pipe 22, the lens module 21, the TIR prism set 25, and the digital micro-mirror device 20 (i.e., the incident light A and the image light B are reflected on Y-Z plane so that they can be observed as a straight line transmission in the viewing direction on Y-axis, thereby leading no additional inclination angle). Further, since the equivalent focal length of the optical mechanical system OMS in projector 200 is a combination of the focal length of the lens module 21 and the plano-convex lens 27 of the intermediate portion R, the optical path of the incident light A can be reduced. As a result, the projector 200 prevails over the projector 100 in space allocation.

In the projector 100 and the projector 200, the range of the digital micro-mirror device 20 for receiving the incident light A to the range of the light pipe 22 ratio is about 1.7~1.9. Equivalently, the magnification of the optical mechanical system OMS is about 1.7~1.9. Further, the aperture of the lens 24 is F1.7. However, the present invention is not limited by the specific magnification and aperture. For example, the magnification and the aperture can be any values in other embodiments.

To sum up, a projector is disclosed in the present invention. The idea is to use a two-axis tilting digital micro-mirror device for volume reduction. By doing so, no additional inclination angle is required between the TIR prism set and the digital micro-mirror device of the projector. Further a plano-convex lens with a reflection plane is introduced to shorten the optical paths. As a result, the volume of the projector in the present invention can be reduced, thereby increasing the convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A projector comprising:
a light source for emitting an incident light;
a digital micro-mirror device having a first side in a first direction and a second side in a second direction perpendicular to the first direction, wherein the first side is longer than the second side, the digital micro-mirror device receives and reflects the incident light as an image light;
a first prism disposed between the light source and the digital micro-mirror device for receiving and transmitting the incident light, the first prism comprising:
a first plane faced to the light source for receiving the incident light;
a second plane adjoined to the first plane; and
an intermediate portion adjoined to the first plane and comprising a reflecting portion and a third plane, wherein the reflecting portion is a plano-convex lens, and the reflecting portion comprises:

a seventh plane adjoined to the third plane; and
an eighth surface opposite to the seventh plane and comprising a mirror coating for reflecting the incident light;
wherein the incident light is transmitted to the reflecting portion and is reflected by the reflecting portion, then, the incident light passes through the second plane;
a second prism disposed between the first prism and the digital micro-mirror device for receiving and transmitting the incident light and the image light, the second prism comprising:
a fourth plane paralleled to the second plane for receiving the incident light;
a fifth plane adjoined to the fourth plane and paralleled to the digital micro-mirror device, wherein the fifth plane comprises an adjoining side paralleled to the first side; and
a sixth plane adjoined to the fourth plane and the fifth plane; and
a lens faced to the sixth plane for receiving and projecting the image light;
wherein the incident light is transmitted to the digital micro-mirror device through the fourth plane and the fifth plane, the image light passes through the fifth plane and is reflected by the fourth plane, when the digital micro-mirror device operates in an ON-state, the image light passes through the sixth plane.

2. The projector of claim 1, wherein the digital micro-mirror device is a two-axis tilting digital micro-mirror device.

3. The projector of claim 1, wherein the fifth plane is perpendicular to the sixth plane.

4. The projector of claim 1, wherein the sixth plane is parallel to the first plane.

5. The projector of claim 1, further comprising:
a first angle located between the first plane and the second plane;
a second angle located between the second plane and the third plane; and
a third angle located between the intermediate portion and the first plane;
wherein the third angle is greater than the first angle and the second angle.

6. The projector of claim 1, wherein an angle of incidence of the incident light transmitted to the first plane is a right angle.

7. The projector of claim 1, wherein a space exists between the second plane and the fourth plane.

8. The projector of claim 1, wherein a space exists between the digital micro-mirror device and the fifth plane.

9. The projector of claim 1, further comprising:
a lens module disposed between the light source and the first plane.

10. The projector of claim 9, wherein an equivalent focal length of the lens module is 80 mm-82 mm.

11. The projector of claim 9, further comprising:
a light pipe disposed between the light source and the lens module for receiving and transmitting the incident light.

12. The projector of claim 11, wherein the light pipe is a wedge-shaped light pipe.

13. The projector of claim 11, wherein the light pipe, the lens module, the prisms, and the digital micro-mirror device form an optical mechanical system with the magnification of the optical mechanical system being 1.7~1.9.

* * * * *